United States Patent Office 3,460,598
Patented Aug. 12, 1969

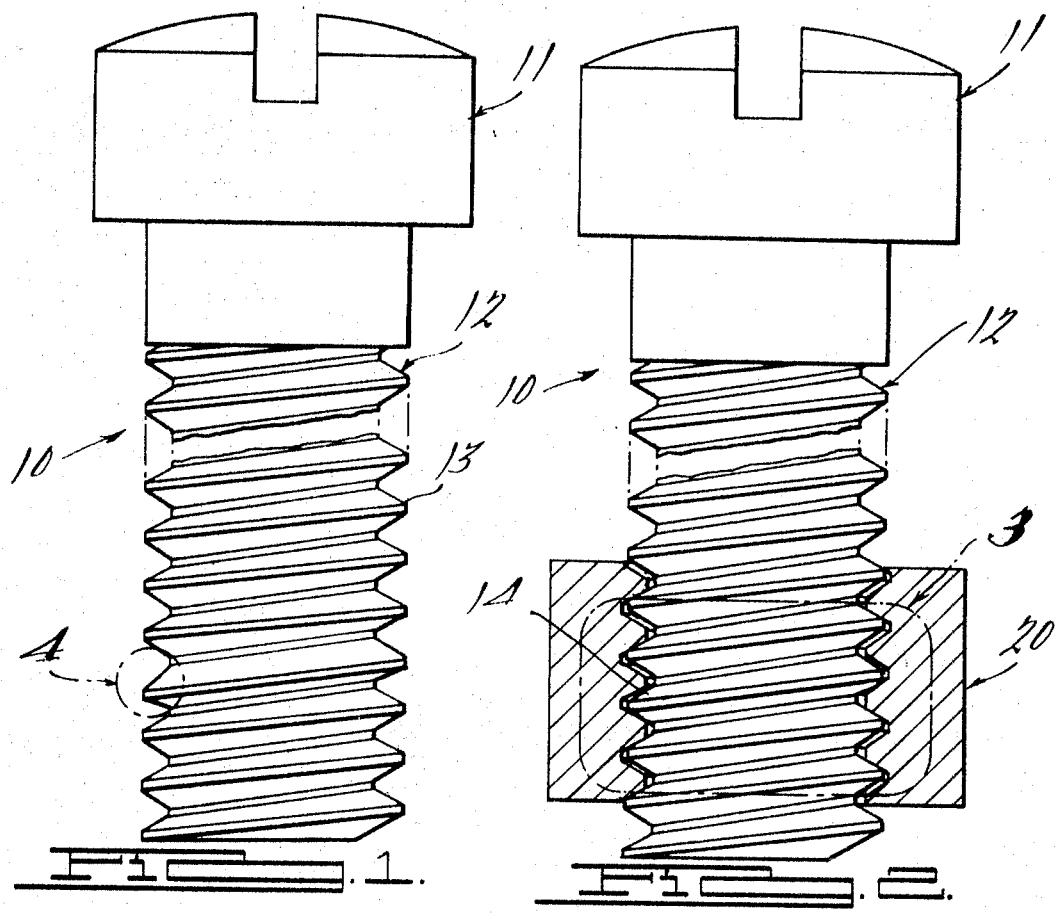
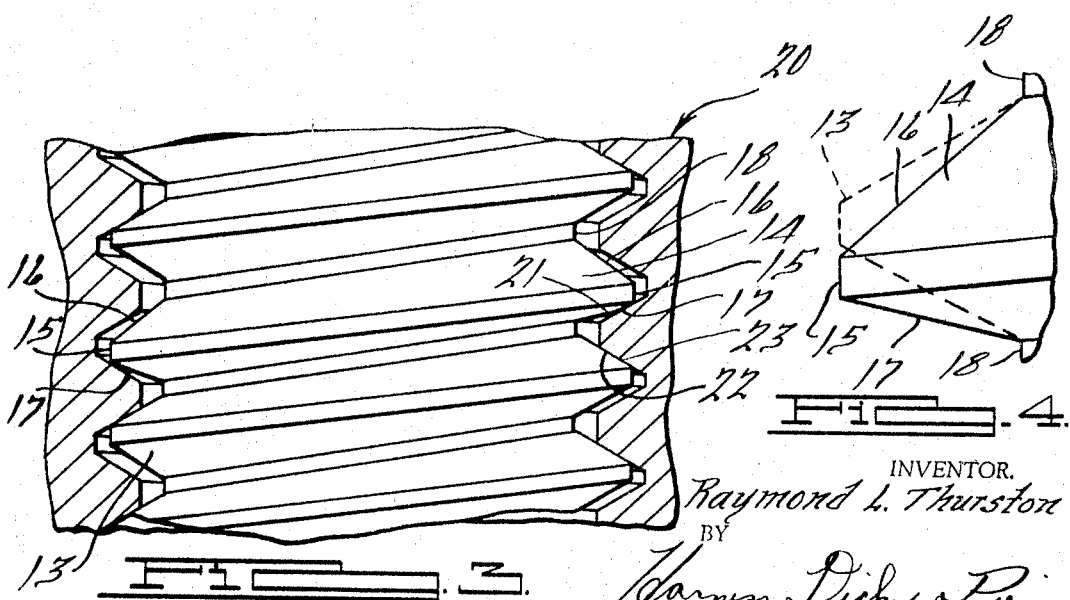

3,460,598
SELF-LOCKING THREAD FORM FOR THREADED ELEMENT
Raymond L. Thurston, Dearborn, Mich., assignor, by mesne assignments, to Microdot Inc., New York, N.Y., a corporation of California
Continuation of application Ser. No. 572,932, Aug. 17, 1966. This application May 9, 1968, Ser. No. 727,940
Int. Cl. F16b 39/30
U.S. Cl. 151—22                 2 Claims

ABSTRACT OF THE DISCLOSURE

An improved thread form for a threaded element that effects self-locking and improves fatigue strength, wherein a portion of the thread is axially deflected from the lead of the standard thread form while the root of the thread is of uniform diameter and lead throughout the standard and locking thread forms. The self-locking thread form develops a locking force between and maximizes the load-carrying ability of adjacent convolutions of standard thread form.

SUMMARY OF THE INVENTION

The invention relates to a self-locking thread form for, for example, a machine screw, wherein locking is achieved by a thread form, that is axially deflected, radially outwardly of the root diameter thereof, intermediate convolutions of standard thread form.

Fatigue strength is maximized by positioning of convolutions having a locking thread form intermediate convolutions having standard thread forms whereby engagement is achieved between juxtaposed flank surfaces of mating standard thread forms.

Accordingly, the object of the invention is an improved locking thread form for a threaded element.

Another object is a threaded element having improved fatigue strength.

Other objects of the invention will be apparent from the following description, claims and drawing.

BRIEF DESCRIPTION OF THE DRAWING

FIGURE 1 is a view in elevation of a screw having a locking thread form embodying features of the present invention, intermediate standard thread forms;

FIG. 2 is a view of the screw illustrated in FIG. 1 in association with an internally threaded element;

FIG. 3 is an enlarged view of the structure illustrated within the circle "3" of FIG. 2;

FIG. 4 is an enlarged view of the locking thread form taken within the circle "4" of FIG. 1, the axial deflection thereof exaggerated for purposes of explanation.

DETAILED DESCRIPTION

Referring to FIGS. 1 and 2 of the drawing, a threaded element 10, for example, a machine screw has a head portion 11, and a threaded portion 12 with a standard thread form 13, and a locking thread form 14. The entire thread 12 including the locking thread form 14 is preferably produced by a rolling operation.

As best seen in FIG. 4 of the drawings, the entire locking thread form 14, including the crest 15 and flanks 16 and 17, is deflected axially out of the lead of the standard thread form 13. However, it is to be noted that the root 18 of the locking thread form 14 remains at the minor diameter and lead of the standard thread form 13. Stated in another manner, each increment of the locking thread form 14, radially outwardly of the root 18 thereof, is axially deflected an amount bearing a constant ratio to its distance from the root 18 of the thread form. This feature maximizes flank contact between the lock thread form 14 and a mating internal thread.

Upon mating with an internally threaded element 20, the flank 17 of the locking thread form 14 engages the opposed flank 21 of the element 20 driving the flank 22 thereof into full flank engagement with the flank 23 of a standard thread form 13.

The instant invention makes it possible to provide a threaded element with a free-running thread as well as with a lock thread form that can be rolled within the thread length. Thus, structural strength and integrity of the threaded element is maximized since no material is removed and all convolutions of the standard thread form are biased into load-bearing position.

Preferably, the lock thread form 14 is deflected axially in the direction opposite to loading of the threaded element so that the aforesaid flank engagement between standard threads is maintained upon loading of the element.

It is to be noted that strength of the locking thread form 14 is maximized by the fact that all portions thereof tend to be deflected axially upon assembly with the element 20 thereby serving to resist bending moments induced by engagement with the complementary fastener 20, actual contact between the locking thread form 14 and the opposed flank 21 of the standard thread form 13 of the element 20 extending from the crest 15 of the locking thread form 14 to approximately the pitch diameter thereof.

What is claimed is:

1. In an externally threaded element having a standard helical thread form for assembly with an element having a complementary standard internal thread,
    a locking thread form on said externally threaded element axially deflected beyond its elastic limit from the lead of said standard thread form, the root diameter and root lead of said standard and locking thread forms being equal and uniform throughout the thread length,
    each portion of said locking thread form radially outwardly from the root thereof being axially deflected an amount bearing a substantially constant ratio to its distance from the root of the thread form, whereby flank contact between the locking thread form and a juxtaposed internal thread is maximized upon assembly and flank contact between said standard threads on said externally and internally threaded elements is maximized.

2. A locking thread form in accordance with claim 1 wherein said locking thread form engages a complementary standard thread from the crest of said locking thread form to approximately the pitch diameter thereof.

References Cited

UNITED STATES PATENTS

| 146,416 | 1/1874 | Watson | 151—27 |
| 1,070,247 | 8/1913 | Haines | 151—22 |
| 2,349,592 | 5/1944 | Hosking | 151—22 |

FOREIGN PATENTS 512,008   8/1939   Great Britain.

RAMON S. BRITTS, Primary Examiner

U.S. Cl X.R.

10—10